May 27, 1958 F. KRISEL 2,835,978
DOUBLE FACE ANGLE AND SET UP PLATE
Filed Aug. 19, 1953
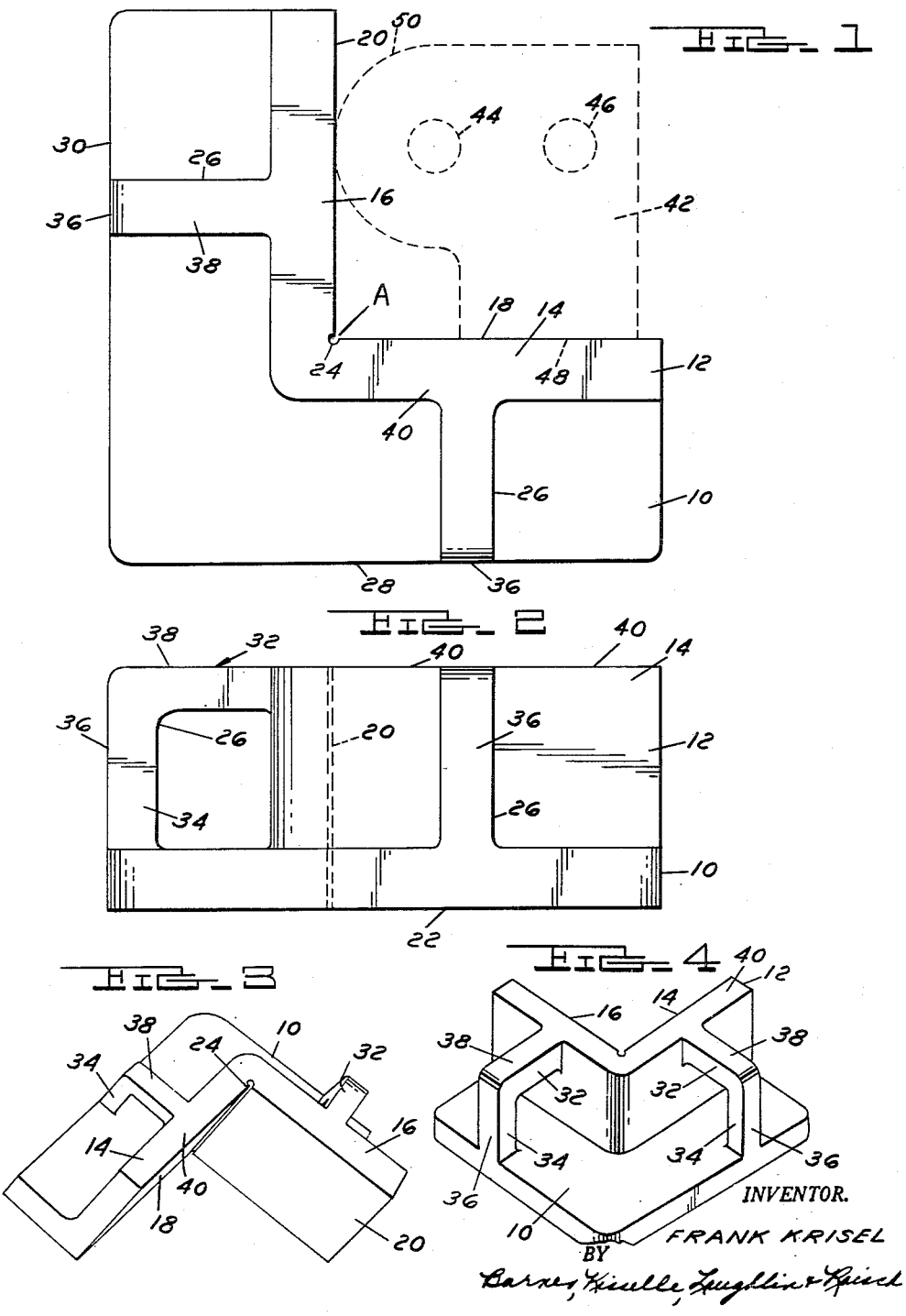
INVENTOR.
FRANK KRISEL
BY
ATTORNEY

United States Patent Office 2,835,978
Patented May 27, 1958

2,835,978

DOUBLE FACE ANGLE AND SET UP PLATE

Frank Krisel, Detroit, Mich.

Application August 19, 1953, Serial No. 375,269

2 Claims. (Cl. 33—90)

This invention relates to an angle plate, particularly of the type used in machining set-ups and in precision gauging.

Angle plates with which I am familiar are generally in the form of two perpendicularly related and integrally connected plates, the outer faces of which are accurately machined so that the angle plate may be positioned with one face on a work surface, such as a surface plate or the table of a machine, and a work piece may be clamped or otherwise secured to the other machined face of the angle plate. With many types of work pieces it is necessary to locate dimensions from two perpendicularly related reference lines in a plane parallel to the base surface on which the angle plate is positioned. With angle plates of conventional construction a set-up of this type usually requires the use of two angle plates secured together in some manner so that the upstanding machined faces are perpendicularly related and may serve as reference planes in laying out the work piece.

It is an object of this invention to provide an angle plate which is adapted with a minimum of difficulty for a variety of machine shop or tool room set-ups, especially those set-ups which require gauging from two perpendicularly related surfaces which are vertically disposed with reference to a base surface on which the angle plate is supported.

In the drawings:

Fig. 1 is a top elevation of the angle plate of this invention.

Fig. 2 is a side view thereof.

Figs. 3 and 4 are perspective views of the angle plate.

The angle plate of this invention generally comprises a base portion or wall 10 and an upstanding wall 12. The wall 12 comprises two portions, 14 and 16, the inner faces 18 and 20 of which are accurately machined as plane surfaces which are perpendicularly related to each other. The faces 18 and 20 are also perpendicularly related to the accurately machined bottom face 22 of the base portion 10. The faces 18 and 20 of wall portions 14 and 16, it will be observed, cooperate to form an inside right angle A. At the intersection of faces 18 and 20 a cylindrical clearance recess 24 is provided. The wall portions 14 and 16 are preferably, though not necessarily, of the same length and height and the base portion 10 extends continuously around the outer sides of these wall portions. The angle plate is preferably formed as an iron casting and accordingly, reinforcing ribs 26 are cast integrally therewith. Ribs 26 form gussets connecting base plate 10 with the wall portions 14 and 16 and project from the rear of wall portions 14 and 16 from approximately the center thereof.

The outer periphery of base portion 10 is defined by perpendicularly related edges 28 and 30. Edges 28 and 30 are accurately machined and are parallel to the faces 14 and 16 respectively. Gussets 26, it will be observed, are rectangularly shaped and each includes a horizontal leg 32 and a vertical leg 34 which cooperate to form a convenient handgrip. The vertical edge faces 36 of these gussets lie in the same planes as the edges 28 and 30 respectively. The upper edge faces 38 lie in the same horizontal plane as the top faces 40 of walls 14 and 16. All of these faces are accurately machined.

In use the angle plate described herein is positioned with the machined face 22 upon a flat supporting surface, such as a surface plate or on the table working surface of a machine if the angle plate is to be used in a machining set-up. Assuming for the purposes of description that on a work piece such as shown in broken lines at 42 it is desired to locate two holes 44 and 46 thereon, the advantages of the angle plate construction of this invention will be readily appreciated. The work piece 42 may require, for example, an accurately machined flat locating surface 48 and a second accurately machined cylindrical locating surface 50. The nature and use to which the work piece is to be put may demand that the holes 44 and 46 be accurately located with reference to the locating surfaces 48 and 50. Under such circumstances the work piece will be appropriately mounted on the angle plate such as by clamps or other means (not illustrated) with the flat locating surface 48 contacting the face 18 of the angle plate and with the cylindrical locating surface 50 of the work piece contacting the face 20 of the angle plate. With this set-up it will be appreciated that the operation of locating the holes 44 and 46 accurately with respect to the locating surfaces 48 and 50 will be relatively simple; the operation will merely necessitate accurate location of these holes from the faces 18 and 20 of the angle plate. It will be obvious that if the angle plate were not provided with the two perpendicularly related faces 18 and 20, then it would be necessary to secure two conventional angle plates together in order to obtain the set-up shown in Fig. 1.

In the set-up just described, it is assumed that the machined flat bottom face 22 of the angle plate is positioned on a supporting surface such as a surface plate or the table of a machine. It will be appreciated that the angle plate of this invention may also be used in the position as viewed in Fig. 1; that is, where it is positioned on a supporting surface such as a surface plate or the bed of a machine with the machined edges 28 and 36 or 30 and 36 forming the supporting surfaces of the angle plate. The edges 28 and 30 extend the full length of the base portion 10 and the edges 36, which are co-planar with the edges 28 and 30, extend the full height of the wall portions 14 and 16. Thus, if it is desired to machine the holes 44 and 46 in a horizontal boring set-up or if it is desired, for example, to machine the near end face of the work piece 42, then the angle plate may be positioned as shown in Fig. 1 and the work piece 42 secured thereon in the position also shown in Fig. 1. This wil provide a solidly supported set-up.

It will be noted also that since the faces 28, 30 and 36 are accurately machined together with the faces 18 and 20 of the walls 14 and 16 respectively, the faces 18 and 20 may be used as reference gauging surfaces from which dimensions of a work piece supported on these surfaces may be checked. Thus, it will be seen that I have provided an angle plate which is adapted for more universal use with less difficulty than is encountered in using angle plates of conventional design.

I claim:

1. An angle support plate for tool room and machine shop use comprising a generally flat L-shaped base having a top face and an accurately machined bottom face, the thickness of said base between said top and bottom faces being substantially smaller than the lateral dimensions thereof, the opposite edge faces of said base being accurately machined and parallel, the inner edge faces of the L forming an accurate inside right angle and the outer edge faces of the L forming an accurate outside right angle, said base having a pair of rigidly fixed upright side walls formed integrally therewith and projecting perpendicularly upwardly from the top face of the base, said side walls being perpendicularly related to one another and having accurately machined inner planar faces coplanar with said inner edge faces of the base forming said inside right angle, said inner planar faces of said side walls each terminating at one end in vertical end edges spaced closely adjacent one another at the apex of said inside right angle of the L-shaped base, the outer faces of said side walls being spaced laterally inwardly from the outer edge faces of the base forming said outside right angle, the upper edge faces of said side walls being machined accurately parallel to the bottom face of said base and rigid reinforcing members extending outwardly from said outer faces of said side walls and downwardly to the top face of and within the confines of said base, each of said last mentioned members having an end face which is parallel to the inner face of the side wall to which it is connected and coplanar with the adjacent outer edge face of the base.

2. An angle support plate as called for in claim 1 wherein said reinforcing members each comprise a pair of perpendicularly related leg portions, one of said leg portions being spaced generally parallel from the adjacent side wall and the other leg portion being spaced parallel from said base, the last mentioned leg portion of each reinforcing member having an accurately machined top face co-planar with the top edge face of the side wall to which it is connected and parallel to the plane of the bottom face of said base.

References Cited in the file of this patent

UNITED STATES PATENTS

| | | |
|---|---|---|
| 223,709 | Cornell | Jan. 20, 1880 |
| 974,479 | Fieldhouse | Nov. 1, 1910 |
| 1,097,393 | Criswell | May 19, 1914 |
| 1,148,196 | Simmons | July 27, 1915 |
| 2,435,799 | Rizor | Feb. 10, 1948 |

OTHER REFERENCES

Taft-Peirce Handbook, General Catalog No. 114, copyright 1950, page 150. (Copy in Division 66.)